United States Patent
Jiang et al.

(10) Patent No.: US 12,385,874 B2
(45) Date of Patent: Aug. 12, 2025

(54) MODULARIZED FIELD-EFFECT TRANSISTOR BIOSENSORS

(71) Applicant: Trustees of Tufts College, Medford, MA (US)

(72) Inventors: Xiaocheng Jiang, Winchester, MA (US); Xiaochuan Dai, Somerville, MA (US); Richard Vo, Medford, MA (US); Huan-Hsuan Hsu, Vancouver (CA); Zhiming Mo, Cambridge, MA (US); Hamed Hosseini Bay, San Diego, CA (US)

(73) Assignee: Trustees of Tufts College, Medford, MA (US)

( * ) Notice: Subject to any disclaimer, the term of this patent is extended or adjusted under 35 U.S.C. 154(b) by 657 days.

(21) Appl. No.: 17/634,835

(22) PCT Filed: Aug. 11, 2020

(86) PCT No.: PCT/US2020/045752
§ 371 (c)(1),
(2) Date: Feb. 11, 2022

(87) PCT Pub. No.: WO2021/030337
PCT Pub. Date: Feb. 18, 2021

(65) Prior Publication Data
US 2022/0299466 A1    Sep. 22, 2022

Related U.S. Application Data

(60) Provisional application No. 62/885,627, filed on Aug. 12, 2019.

(51) Int. Cl.
*G01N 27/327* (2006.01)
*G01N 27/414* (2006.01)

(52) U.S. Cl.
CPC .................. *G01N 27/4145* (2013.01)

(58) Field of Classification Search
CPC .................................... G01N 27/4145
See application file for complete search history.

(56) References Cited

U.S. PATENT DOCUMENTS 5,989,409 A * 11/1999 Kurnik ............... G01N 27/3272
                                                    604/20
6,521,430 B1    2/2003  Orwar et al.
(Continued)

FOREIGN PATENT DOCUMENTS

WO    2015183871 A1    12/2015

OTHER PUBLICATIONS

Bay et al., "Hydrogel Gate Graphene Field-Effect Transistors as Multiplexed Biosensors." Nano Letters vol. 19, Issue 3, Mar. 25, 2019 (Mar. 25, 2019) [online] <https://doi.org/10.1021/acs.nanolett.9b00431>.

(Continued)

*Primary Examiner* — Alexander S Noguerola
(74) *Attorney, Agent, or Firm* — Occhiuti & Rohlicek LLP

(57) ABSTRACT

A sensor includes a bio-recognition module and a transducer module having a dock sized and shaped to receive the bio-recognition module. The bio-recognition modules comprise a hydrogel matrix having bio-recognition elements embedded therein. The bio-recognition elements cause a particular biochemical input to engage in an interaction that generates a perturbation in an electric field within the bio-recognition module. The transducer module transduces this perturbation into an electrical signal that is provided at an output of the transducer module. This electrical signal indicates occurrence of the interaction.

20 Claims, 2 Drawing Sheets

(56) References Cited

U.S. PATENT DOCUMENTS

| | | | |
|---|---|---|---|
| 6,546,268 B1* | 4/2003 | Ishikawa | A61B 5/14542 |
| | | | 257/E29.022 |
| 6,587,705 B1* | 7/2003 | Kim | A61B 5/14532 |
| | | | 435/14 |
| 2007/0135698 A1 | 6/2007 | Shah et al. | |
| 2010/0216175 A1* | 8/2010 | Melker | A61B 5/083 |
| | | | 436/95 |
| 2016/0169835 A1 | 6/2016 | Sakata et al. | |
| 2016/0291001 A1 | 10/2016 | Revzin et al. | |
| 2017/0181669 A1 | 6/2017 | Lin et al. | |

OTHER PUBLICATIONS

Dai, et al., "Modularized Field-Effect Transistor Biosensors." Nano Letters vol. 19, Issue 9, Aug. 19, 2019 (Aug. 19, 2019) [online] <https://doi.org/10.1021/acs.nanolett.9b02939>.

International Search Report and Written Opinion, PCT Application No. PCT/US2020/045752, mailed Dec. 2, 2020 (16 pages).

\* cited by examiner

MODULARIZED FIELD-EFFECT TRANSISTOR BIOSENSORS

RELATED APPLICATIONS

This application is a national stage of International Application no. PCT/US2020/045752, filed Aug. 11, 2020, which claims the benefit of the Aug. 12, 2019 priority date of U.S. Provisional Application 62/885,627, the contents of which are herein incorporated by reference.

FIELD OF INVENTION

The invention relates to sensors, and in particular, to biosensors.

BACKGROUND

In a field-effect transistor operates by using an applied electric field to modulate a current. The current flows between a source and a drain terminal. The electric field is applied to the gate. A field-effect transistor can thus be used to sense changes in electric field at the gate.

A solution typically contains species that possess electric charge. In some cases, the species itself is charged. This is the case for ions. In other cases, localized portions of a species may be charged. Therefore, in the presence of a solution, a gate will experience an electric field that arises from the superposition of charges existing in the solution.

If an interaction occurs between species in the solution, this electric field will often change. A field-effect transistor that is sufficiently sensitive will detect this change. This will result in a change in current from which one can infer both the occurrence of the interaction and the extent to which it has occurred. This creates the opportunity to use the field-effect transistor as a sensor.

A typical method for using the field-effect transistor as a sensor in this manner is to functionalize its gate with a substance promotes an interaction that involves a target species.

For example, if one wishes to detect a particular protein, one may functionalize the gate with antibodies specific to that protein. In such a case, the interaction is irreversible. One cannot easily unbind the protein from its antibody.

In some cases, the interaction is reversible. For example, one may functionalize the gate with a catalyst that promotes an interaction between the target species and some other species.

In either case, after having suitably functionalized the gate, one then exposes the functionalized gate to a solution that may contain the target species. To the extent that species is present in this solution, an interaction occurs. This interaction reveals itself as a perturbation in the surface-charge distribution at the gate. The resulting perturbation changes a current between the drain and source terminals of the FET.

A difficulty that arises is that once the interaction has occurred, it is difficult to re-use the same transistor. This is particularly true when the interaction is irreversible. In the case of reversible interactions, a difficulty that arises is that it is difficult to re-functionalize the gate with another substance for use in a different kind of assay. Yet another difficulty that arises is that the various substances tend to be complex molecules that have finite lifetimes.

SUMMARY

The invention provides the ability to manufacture bio-recognition modules of various types that can easily be swapped in and out of a common transducer module. This permits independent fabrication of the bio-recognition modules and transducer modules.

A bio-recognition module contains a distribution of bio-recognition elements within a matrix. The bio-recognition module receives biochemical inputs and provides a confined environment for interaction of those inputs with the bio-recognition elements. The result of the interaction is an electric field that is sensed by the transducer module.

In principle, any material through which diffusion occurs can be used for the bio-recognition module. However, functionalized hydrogel offers particularly seamless structural and functional integration with field-effect transistors.

The bio-recognition module's matrix creates a confined microenvironment. Preferably, the matrix is made of a material having a diffusion constant that is easy to manipulate. This results in the ability to create tunable diffusion barriers. Doing so means that it is possible to control the rate at which substances enter or leave the bio-recognition module. This in turn provides the opportunity to confine the outputs of the interaction. The resulting volume is thus enriched with the outputs of the interaction. This tends to amplify or concentrate the signal that indicates the occurrence of the interaction so that it can more readily be detected. These amplified biochemical and/or charge signals are important to the reliable signal transduction across the interface between the bio-recognition module and the transducer module. A suitable choice of material for use as the bio-recognition module's matrix is a hydrogel.

It has also been found that the confining volume mitigates the Debye screening that would ordinarily hinder detection of the total electric field present in a solution with high ion concentration. Thus further promotes reliable signal transduction.

In contrast, in conventional sensors based on field-effect transistors, the output of the interaction is often quickly diluted. In the case of a buffered or physiological solution, any electrically-charged species produced by the interaction are quickly neutralized.

Yet another advantage of hydrogel as a material that forms the basis of a bio-recognition module is its overall structural integrity and biocompatibility.

The hydrogel's structural stability makes it possible for manufactures to independently design and mass produce particular bio-recognition modules for specific applications. The hydrogel itself tends to impart structural stability to the constituents that have been used to functionalize it. This means that the bio-recognition modules can have an extended shelf life.

Additionally, because the bio-recognition modules are interchangeable, it is possible to reprogram a particular transducer module simply by replacing one bio-recognition module with another of a different type in much the same way that an amino acid can be transformed by simply replacing its R group.

In one aspect, the invention features an article of manufacture that includes a transducer module and a bio-recognition module. The transducer module comprises a dock for receiving the bio-recognition module. Meanwhile, the bio-recognition module is sized and shaped to engage the transducer module at this dock.

The bio-recognition module comprises a matrix having bio-recognition elements embedded therein. These bio-recognition elements have been selected to cause a particular biochemical input to engage in an interaction that generates a perturbation in an electric field within the bio-recognition module. A particularly useful matrix is a hydrogel matrix.

As a result of being coupled with the bio-recognition module, the transducer module transduces the perturbation into an electrical signal that is provided at an output of the transducer module. This electrical signal is indicative of occurrence of the interaction.

Embodiments include those in which the bio-recognition module is one of many bio-recognition modules, all of which have been sized and shaped to engage the transducer module at the dock. Among these embodiments are those in which all bio-recognition modules in the plurality have the same configuration of bio-recognition elements embedded therein, those in which there exist bio-recognition modules in the plurality that have different bio-recognition elements embedded therein, those in which there exist bio-recognition modules in the plurality that have different porosities, those in which there exist bio-recognition modules in the plurality that have different charge distributions, those in which there exist bio-recognition modules in the plurality that have different chemical affinities, and those in which there exist bio-recognition modules in the plurality that have different polymer compositions.

Embodiments also include those in which the transducer module comprises a field-effect transistor and the dock is disposed to receive the bio-recognition module at a gate of the field-effect transistor. Among these are embodiments in which the field-effect transistor is a graphene field-effect transistor, those in which it is a metal-oxide-semiconductor field-effect transistor, those in which it is a nanowire field-effect transistor, and those in which it is a carbon nanotube field-effect transistor.

Embodiments further include those in which the bio-recognition elements comprise an enzyme, those in which they comprise an antibody, those in which they comprise an organelle, those in which they comprise a cell, those in which they comprise proteins, those in which they comprise peptides, those in which they comprise biological components, those in which they comprise cellular components, those in which the comprise small molecules, those in which they comprise active agents, including drugs and therapeutic agents, and combinations of the foregoing.

In some embodiments, the solution is a biological solution. In others, it is a physiological solution. Also among the embodiments are those in which the solution comprises blood, those in which it comprises urine, those in which it comprises saliva, and those in which it comprises cerebral spinal fluid, those in which it comprises an active agent, those in which it comprises a pharmacological compound, and those in which it comprises a therapeutic compound, and any combinations of the foregoing.

In some embodiments, the bio-recognition elements are chemically conjugated to the hydrogel matrix. In others, they are physically encapsulated by the hydrogel matrix.

In some embodiments, the bio-recognition module is detachable, as a result of which, after having been attached to the transducer module, the bio-recognition module can be removed from the transducer module such that the transducer module is prepared to receive another bio-recognition module.

Because the hydrogel has a stabilizing effect, the bio-recognition module can have an extended shelf life at room temperature. In some cases, the shelf life is at least a month. In other cases, it is at least a year. As used herein, "shelf life" is determined by whether or not an ordinary artisan exercising due care and knowledgeable about the circumstances of storage of the module would have regarded the module as still being sufficiently effective to perform the particular sensing task that the ordinary artisan has in mind to carry out.

Further embodiments include a handle that is coupled to the bio-recognition module.

Yet other embodiments also include a mold having a plurality of wells, each of which is sized and shaped to conform to the bio-recognition module.

In another aspect, the invention features a process that includes coupling a bio-recognition module to a dock of a transducer module. The bio-recognition module is one that has been sized and shaped to engage the transducer module at the transducer module's dock. The method continues with allowing a biochemical input to diffuse into the bio-recognition module, thereby causing an interaction that arises from presence of bio-recognition elements embedded therein. These bio-recognition elements have been selected to promote an interaction that involves the input. This is followed by detecting an electrical signal that is indicative of the interaction at the transducer module's output.

Some practices further include after having observed the electrical signal, decoupling the bio-recognition module from the dock and coupling a different bio-recognition module into the dock.

DETAILED DESCRIPTION

Figure 1:
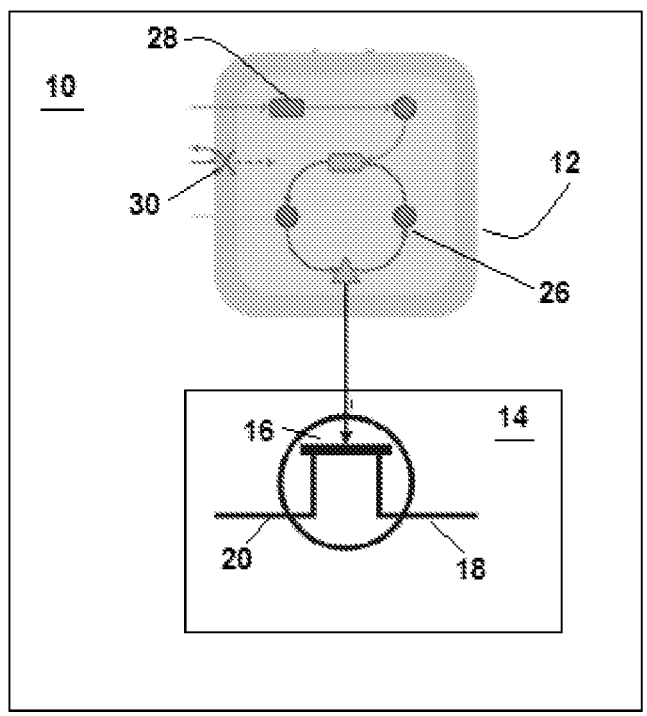
FIG. 1 shows a diagram of a sensor.

FIG. 1 shows a sensor 10 that includes a bio-recognition module 12 coupled to a transducer module 14. When used for biological applications, the sensor 10 is often called a "bio-sensor."

In the illustrated embodiment, the transducer module 14 is a field-effect transistor having a gate, 16, a source 18, and a drain 20. A particularly useful type of field-effect transistor is a graphene field-effect transistor.

Figure 2:
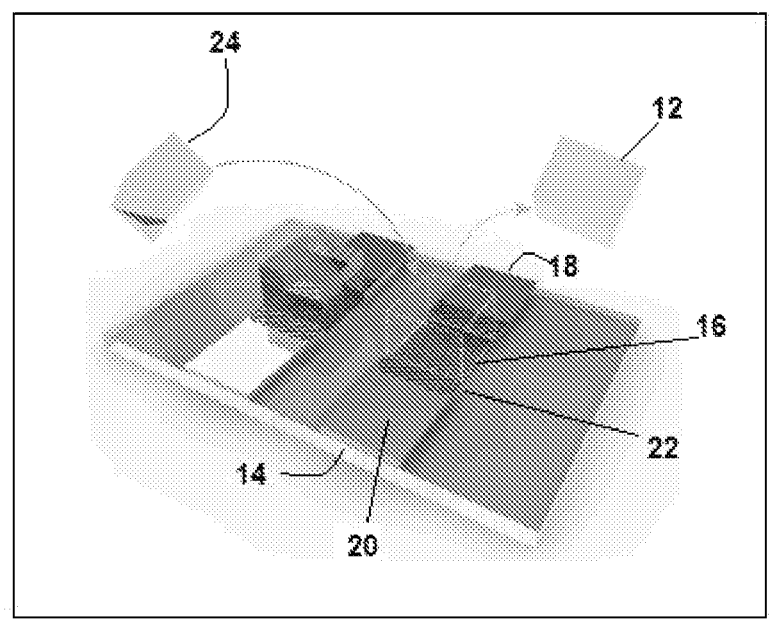
FIG. 2 shows a physical implementation of the sensor shown in FIG. 1.

The bio-recognition module 12 is a hydrogel structure having a pre-defined geometry that depends on the geometry of a dock 22 that receives it, as shown in FIG. 2.

FIG. 2 shows the bio-recognition module 12 being removed and a new bio-recognition module 24 prepared to take its place. The new bio-recognition module need not be the same type. It merely has to have the same geometry so that it can engage the same dock 22. This interchangeability means that the same transducer module 14 can be re-used to carry out different sensing tasks simply be exchanging bio-recognition modules 12, 24.

Referring back to FIG. 1, the bio-recognition module 12 includes bio-recognition elements 26 embedded therein. These bio-recognition elements 26 interact with biochemical inputs 28 that are in a solution in which the bio-recognition module 12 has been immersed. The biochemical inputs 28 enter the bio-recognition module 12 by diffusion. The rate of diffusion can be adjusted by suitably selecting the properties of the hydrogel. This can also be used to exclude species 30 that are also in solution from entering bio-recognition module 12.

The bio-recognition module 12 confines the interaction in a small volume. By controlling the diffusion, it is possible to build up the concentration of biochemical outputs within this volume, thus enhancing the electrical signal that is generated by the interaction. This results in a sensor 10 having a higher signal-to-nose ratio than what would have resulted had the interaction been in an unconfined volume.

Specific embodiments include those in which the bio-recognition elements 26 are bio-recognition molecules, such as enzymes, antibodies, and aptamers.

For clarity, the figures show a bio-recognition module 12 having sides with lengths that are not too different from each other. In practice, the thickness of the bio-recognition module 12 is preferably kept small to promote rapid diffusion of biochemical inputs 28 and to confine the interactions so that they tend to take place as close as possible to the gate's surface. As used herein, "thickness" refers to an extent of the dimension along a vector that is normal to the surface of the dock 22 as shown in the figure.

The particular hydrogel used in a bio-recognition module 12 is application specific. However, in one embodiment, a hydrogel monomer solution was made by mixing PEGDA (MW 575 grams per mole) with co-initiators 1-vinyl-2-pyrrolidinone 99% (VP) (Sigma, 201-800-4) and triethanolamine (TEA) (Sigma, 90279) with ratios of 77.45, 15.15, and 7.41% weight by volume, respectively.

The use of an interchangeable bio-recognition module 12 makes it unnecessary to functionalize the gate 16 of the transducer module 14. Instead of functionalizing the gate 16, one functionalizes the hydrogel used in the bio-recognition module 12.

By functionalizing the hydrogel instead of the gate 16, one solves an additional problem. The species used to functionalize gate 16 is typically a large molecule that is somewhat unstable in solution. This means that the sensor 10 must be used not long after it has been prepared.

The same species, when embedded in a hydrogel matrix, tends to be more stable. Thus, it becomes possible to maintain an inventory of bio-recognition modules 12 with the assurance that they will remain effective even after the passage of some time. This extension of shelf life is significant, with shelf lives on the order of weeks or months for common bio-recognition elements 26.

As a result of being able to maintain an inventory of bio-recognition modules 12, when one is ready to carry out a procedure, all that is necessary is to retrieve the appropriate bio-recognition module 12 from the shelf and drop it into the dock 22. The process is comparable in simplicity and convenience to inserting a battery in a device or replacing a used battery with a fresh battery.

The existence of an inventory of 12 also makes it possible to use the same 14 for different kinds of assays. To do so, one simply inserts a different kind of 12 into the dock 22. The process is no more complex than replacing a lithium battery with a zinc-carbon battery.

In some embodiments, the hydrogel used in the bio-recognition module 12 is a bioactive hydrogel that has been functionalized by incubating an enzyme solution with a linker. In some embodiments, the enzyme solution is a solution of penicillinase from *Bacillus cererus* and urease from *Canavalia ensiformis* mixed with 40-50 microliters of a 100 microgram-per-microliter heterobifunctional PEG linker (Acrylate-PEG2K-NHS) (Sigma, JKA5021) and incubated for an hour at room temperature. Solutions were prepared using 1× phosphate buffer saline (Gibco). PEGylated enzyme solution was mixed with PEGDA solution and Eosin Y disodium solution (5.0 milligrams per milliliter) with ratios of 50%, 48.75%, and 1.25%, respectively.

Figure 3:
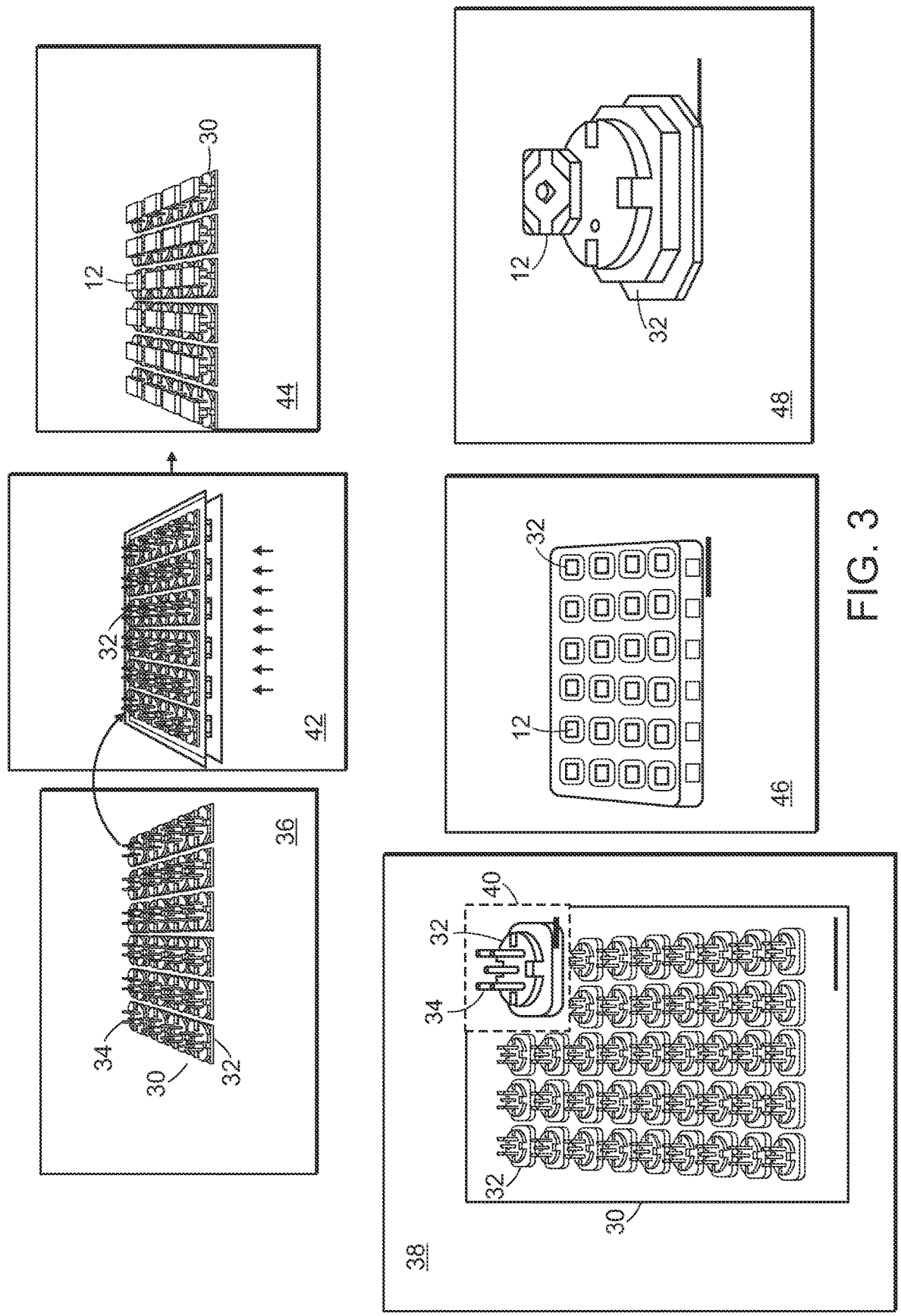
FIG. 3 show steps in manufacturing a bio-recognition module used in the sensor of claim 1.

Referring now to FIG. 3, the manufacture of a bio-recognition module 12 includes the use of an additive manufacturing process to create a mold 30 with wells 32, each of which will ultimately result in one bio-recognition module 12. A suitable material for use in the mold 30 is polydimethylsiloxane. The resulting structure can be seen in isometric view 36 and in plan view 38. An enlargement 40 in the plan view 38 shows details of a particular well 32 in which one can see a pillars that are used to handle the bio-recognition module 12.

Each well 32 is filled a hydrogel monomer solution. Since the bio-recognition module 12 is made of hydrogel, it is somewhat difficult to handle directly. Thus, each well 32 also includes a handle 34 so that the bio-recognition module 12 can be picked up and docked in a suitable dock 22.

The monomer solution in the well, with a suitable concentration of 26 having been added, is then exposed to light to carry out polymerization, as shown in the isometric view 42. In a typical embodiment, the bio-recognition module 12 is a rectangular prism having two-millimeter sides and a thickness of less than a millimeter.

The resulting mold 30 now holds multiple bio-recognition modules, as shown in the view 44 and view 46. These can then be separated from each other to form an individual package, shown in the view 48, that includes the bio-recognition module 12 and the well 32, which protects the bio-recognition module 12 until it is ready for use.

Having described the invention and a preferred embodiment thereof, what is new and secured by Letters Patent is:

1. A manufacture comprising a first bio-recognition module and a transducer module, said transducer module comprising a dock for receiving said first bio-recognition module following removal of a second bio-recognition module from said dock, wherein said first bio-recognition module is configured to transition between being detached from said transducer module and attached to said transducer module, wherein said first bio-recognition module comprises a confined environment comprising a matrix and, embedded within said matrix, bio-recognition elements that have been selected to cause a biochemical input to engage in an interaction that results in a biochemical output, wherein said interaction causes a perturbation in an electric field within said confined environment of said bio-recognition module, wherein said first bio-recognition module further comprises a tunable diffusion barrier having a diffusion coefficient that inhibits diffusion of said biochemical output out of said confined environment, whereby concentration of said biochemical output within said confined environment of said bio-recognition module increases, thereby amplifying said perturbation, and wherein said transducer module is configured to transduce said amplified perturbation in said bio-recognition module and to provide an electrical signal indicative of occurrence of said interaction at a transducer-module output, further comprising a plurality of bio-recognition modules, all of which are sized and shaped to engage said transducer module at said dock, wherein said first and second bio-recognition modules are constituents of said plurality, wherein said plurality comprises modules in which said bio-recognition elements comprise an enzyme, modules in which said bio-recognition elements comprise an antibody, modules in which said bio-recognition elements comprise an organelle, modules in which said bio-recognition elements comprise a cell, modules in which said bio-recognition elements comprise a peptide, modules in which said bio-recognition elements comprise a small molecule, modules in which said bio-recognition elements comprise a pharmacological agent, and modules in which said bio-recognition elements comprise a therapeutic agent.

2. The manufacture of claim 1, further comprising a plurality of bio-recognition modules, all of which are sized and shaped to engage said transducer module at said dock, wherein said first and second bio-recognition modules are constituents of said plurality, and wherein all bio-recognition modules in said plurality have the same configuration of bio-recognition elements embedded therein.

3. The manufacture of claim 1, wherein said transducer module is selected from the group consisting of a graphene field-effect transistor, a metal-oxide-semiconductor field-effect transistor, a nanowire field-effect transistor, and a carbon nanotube field-effect transistor.

4. A manufacture comprising a first bio-recognition module and a transducer module, said transducer module comprising a dock for receiving said first bio-recognition module following removal of a second bio-recognition module from said dock, wherein said first bio-recognition module is configured to transition between being detached from said transducer module and attached to said transducer module, wherein said first bio-recognition module comprises a confined environment comprising a matrix and, embedded within said matrix, bio-recognition elements that have been selected to cause a biochemical input to engage in an interaction that results in a biochemical output, wherein said interaction causes a perturbation in an electric field within said confined environment of said bio-recognition module, wherein said first bio-recognition module further comprises a tunable diffusion barrier having a diffusion coefficient that inhibits diffusion of said biochemical output out of said confined environment, whereby concentration of said biochemical output within said confined environment of said bio-recognition module increases, thereby amplifying said perturbation, and wherein said transducer module is configured to transduce said amplified perturbation in said bio-recognition module and to provide an electrical signal indicative of occurrence of said interaction at a transducer-module output, wherein said transducer module comprises a field-effect transistor and said dock is disposed to receive said bio-recognition module at a gate of said field-effect transistor.

5. The manufacture of claim 4, further comprising a plurality of bio-recognition modules, all of which are sized and shaped to engage said transducer module at said dock, wherein said first and second bio-recognition modules are constituents of said plurality, and wherein all bio-recognition modules in said plurality have the same configuration of bio-recognition elements embedded therein.

6. The manufacture of claim 4, further comprising a plurality of bio-recognition modules, wherein said first and second bio-recognition modules are constituents of said plurality, wherein bio-recognition modules within said plurality of bio-recognition modules are sized and shaped to engage said transducer module at said dock, and wherein there exist bio-recognition modules in said plurality that have different bio-recognition elements embedded therein.

7. The manufacture of claim 4, wherein said bio-recognition elements are chemically conjugated to a hydrogel matrix.

8. The manufacture of claim 4, wherein said bio-recognition elements are physically encapsulated by a hydrogel matrix.

9. The manufacture of claim 4, further comprising a plurality of bio-recognition modules, all of which are sized and shaped to engage said transducer module at said dock, wherein said first and second bio-recognition modules are constituents of said plurality, and wherein there exist bio-recognition modules in said plurality that have different porosities.

10. The manufacture of claim 4, further comprising a plurality of bio-recognition modules, all of which are sized and shaped to engage said transducer module at said dock, wherein said first and second bio-recognition modules are constituents of said plurality, and wherein there exist bio-recognition modules in said plurality that have different charge distributions.

11. The manufacture of claim 4, further comprising a plurality of bio-recognition modules, all of which are sized and shaped to engage said transducer module at said dock, wherein said first and second bio-recognition modules are members of said plurality, and wherein there exist bio-recognition modules in said plurality that have different chemical affinities.

12. The manufacture of claim 4, further comprising a plurality of bio-recognition modules, all of which are sized and shaped to engage said transducer module at said dock, wherein said first and second bio-recognition modules are members of said plurality, and wherein there exist bio-recognition modules in said plurality that have different polymer compositions.

13. The manufacture of claim 4, wherein said first bio-recognition module has a shelf life of over one month.

14. The manufacture of claim 4, further comprising a handle that is coupled to said first bio-recognition module.

15. The manufacture of claim 4, further comprising a mold having a plurality of wells, each of which is sized and shaped to conform to said first bio-recognition module.

16. The manufacture of claim 4, wherein said matrix comprises a hydrogel matrix.

17. The manufacture of claim 4, wherein said transducer module is selected from the group consisting of a graphene field-effect transistor, a metal-oxide-semiconductor field-effect transistor, a nanowire field-effect transistor, and a carbon nanotube field-effect transistor.

18. A method comprising uncoupling a first bio-recognition module from a transducer module and coupling a second bio-recognition module to said transducer module, said first and second bio-recognition modules having been sized and shaped to engage said transducer module, causing diffusion of a biochemical input into a confined environment within said second bio-recognition module, thereby causing an interaction that arises from presence of bio-recognition elements embedded in a matrix within said second bio-recognition module, said bio-recognition elements having been selected to promote an interaction with said input, wherein said interaction results in a biochemical output that causes a perturbation of an electric field within said bio-recognition module, and, amplifying said perturbation, wherein amplifying said perturbation comprises inhibiting diffusion of said biochemical output out of said confined environment of said second bio-recognition module, at an output of said transducer module, detecting an electrical signal that is indicative of said amplified interaction, said method further comprising amplifying said perturbation over time, wherein amplifying said perturbation comprises allowing a concentration of said biochemical output in said bio-recognition module to increase over time as a result of said bio-recognition module having been tuned to have a diffusion constant that inhibits diffusion of said biochemical output out of said bio-recognition module.

19. The method of claim 18, further comprising, after having observed said electrical signal, decoupling said second bio-recognition module from said dock and coupling a third bio-recognition module into said dock.

20. The method of claim 18, further comprising mitigating Debye screening in said confined environment.

* * * * *